United States Patent [19]

Gordon et al.

[11] Patent Number: 4,630,032
[45] Date of Patent: Dec. 16, 1986

[54] APPARATUS FOR DECODING ERROR-CORRECTING CODES

[75] Inventors: John A. Gordon, Hatfield; Graham K. King, Sandridge, both of United Kingdom

[73] Assignee: British Telecommunications, Great Britain

[21] Appl. No.: 616,180

[22] Filed: Jun. 1, 1984

[30] Foreign Application Priority Data

Jun. 3, 1983 [GB] United Kingdom ................. 8315363

[51] Int. Cl.⁴ .............................................. H03M 5/00
[52] U.S. Cl. ................................ 340/347 DD; 371/43
[58] Field of Search ................... 371/43; 340/347 DD

[56] References Cited

U.S. PATENT DOCUMENTS

| 4,240,156 | 12/1980 | Doland | 371/43 |
| 4,346,473 | 8/1982 | Davis | 371/43 |
| 4,354,269 | 10/1982 | Vries et al. | 371/43 |
| 4,493,082 | 1/1985 | Cumberton et al. | 371/43 |

Primary Examiner—Bernard Roskoski
Attorney, Agent, or Firm—Nixon & Vanderhye

[57] ABSTRACT

An improvement to a Viterbi-type decoder for decoding convolutional error-correcting codes whereby decisions regarding which predecessor state to a given state most probably corresponds to the best path terminating in that given state are stored in association with that given state and not in association with the best path. Paths are reconstructed by searching through such stored decisions. Such searches are used to recover a number, possibly greater than one of data symbols for later output from the decoder. The larger this number, the less frequently a search need be carried out.

12 Claims, 3 Drawing Figures

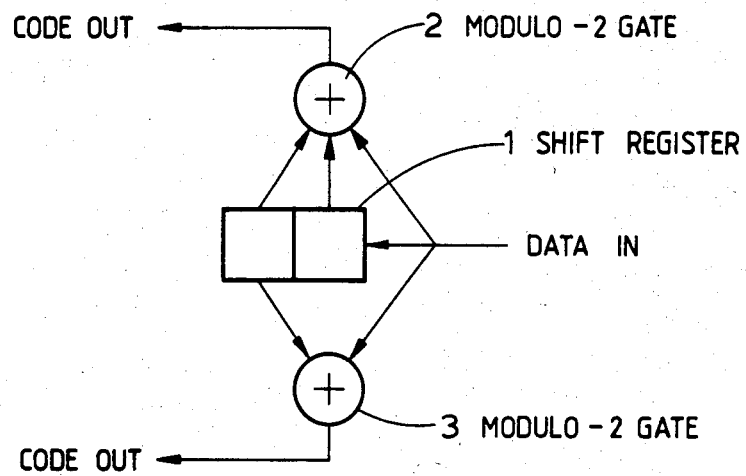
Fig.1
Fig.2
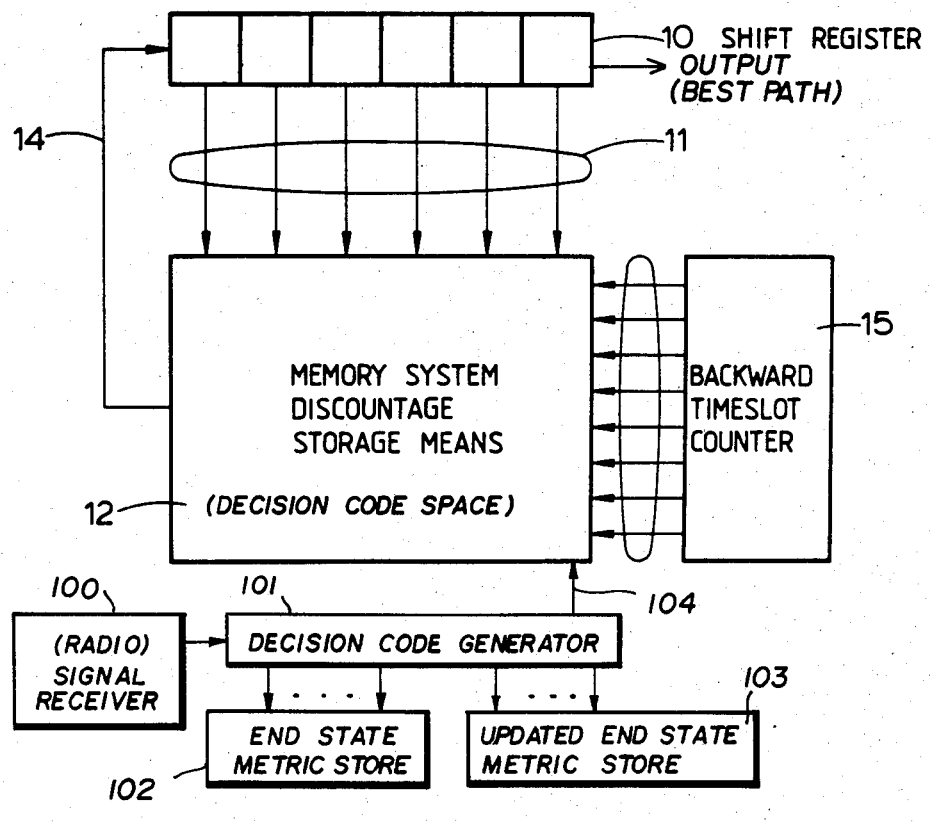

APPARATUS FOR DECODING ERROR-CORRECTING CODES

This invention relates to the design of electronic apparatus for the transmission of digital information, and specifically to the design of apparatus for decoding error-correcting codes.

A commonly occuring problem when transmitting digital information is the presence of noise which causes some digits to be received in error. To overcome this, use is often made of ERROR CORRECTING CODES. Error correcting codes are described in the book "Error Correcting Codes" by Peterson and Weldon, MIT Press, 1972. The particular type of error correcting code to which this invention relates is known as a CONVOLUTIONAL CODE. These are described in the article "Convolutional Codes and their Performance in Communication Systems" by A J Viterbi published in the IEEE Transactions on Communication Technology, volume COM-19, Number 5.

The electronic pathway over which data is to be transmitted is called a CHANNEL. A channel is said to be NOISY when signals received through it are likely to be a corrupted version of those actually sent over it. Messages to be protected against the corruption introduced by a noisy channel will here be called DATA. When using a convolutional error correcting code to protect data signals from noise, use is made of a CODEC. A codec consists of two devices known as a CODER and a DECODER. Data to be protected against noise is fed into the coder which in turn generates a new signal called the CODE which is actually transmitted over the noisy channel. The signal received through the noisy channel is a corrupted version of the code and it is the purpose of the decoder, using only knowledge of the corrupted, received code, to try to find a good approximation to the data which was originally fed into the coder.

It is possible to do this if the code used contains only words from a small subset of all possible combinations of symbols in a carefully organised manner.

As an analogy, if the sequence of symbols "Mary had a lxttle lamb" is received it is clear that "lxttle" is incorrect and that instead the word "little" was intended since there is no word "lxttle". Like an error correcting code, the English language consists of only a small subset of all possible combinations of symbols (i.e. letters), and so an arbitrary set of symbols such as "lxttle" is not usually an English word. The noisy channel has no knowledge of the spelling of English and so errors introduced tend to produce non-code (i.e. non-English) which is easily spotted and corrected. The correction is performed by finding the "nearest" codeword to the received signal, i.e. in the analogy, the English word most similar to the received collection of letters. A collections of symbols which is a codeword is called LEGAL while any other combination of symbols is said to be ILLEGAL. Decoders operate by finding the data corresponding to the nearest, legal codeword to the received (illegal) signal.

The present invention is an improvement to the circuitry of decoders for convolutional error-correcting codes, and specifically to a type of decoder known as a Viterbi decoder. The particular improvement to such decoders to which this invention relates is the handling of the PATH-HISTORY MANAGEMENT PROBLEM which will be described shortly.

A brief description of a coder and a prior art Viterbi decoder will now be given in order to provide background material for an understanding of the invention. The description given here is for what is normally called a HARD DECISION DECODER. There is an alternative type called a SOFT DECISION DECODER which differs in a number of respects from the description here. However both types are identical in those features which affect the present invention, which is equally applicable to either hard or soft decision decoders. The hard decision type illustrated here is the simpler to describe. Our description will also be in terms of what is called a RATE ½ decoder. Once again this restriction is purely for the purpose of keeping the description simple and does not reflect a limitation on the scope of the invention.

The following description will refer to the accompanying drawing in which:

FIG. 1 shows a coder which is not a part of the invention, and

FIGS. 2 and 3 show the organisation of memory decoding according to the invention.

Figure 3:
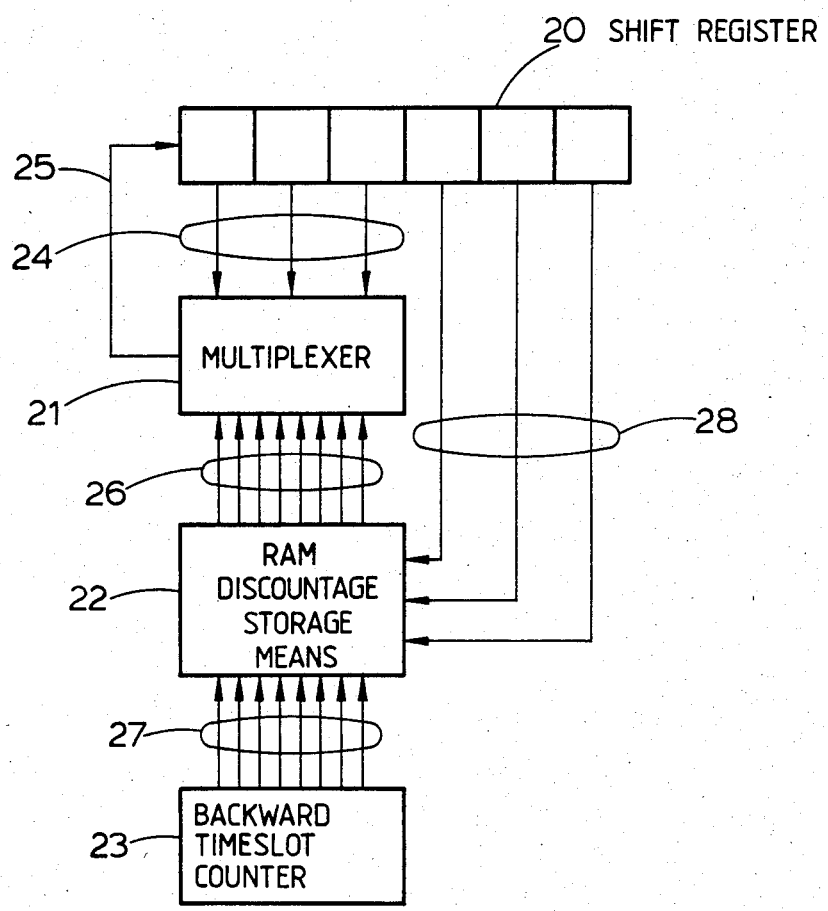

Referring to FIG. 1, which shows a coder for a simple convolutional code, binary data is fed one bit at a time into the shift register 1 which in this example consists of two stages. In general the number of stages is called K so that K is two in FIG. 1. In general K is called the CONSTRAINT LENGTH of the code. Some authors would say that the constraint length in FIG. 1 is three but this is just a difference in terminology.

Modulo-2 gates 2 and 3 are used to form two modulo-2 sums of certain subsets of the data in the shift register. These two modulo-2 sums are the two code symbols to be transmitted. It is convenient to regard the contents of the shift register as the STATE of the coder. Thus in FIG. 1 there are four possible states, namely 00, 01, 10 and 11. In general there are $2^K$ (2 raised to the power K) states in a code of contraint length K. The two code symbols sent to the noisy channel for each data bit entered into the coder depend:

(1) upon the state of the coder, and
(2) upon the data bit.

Similarly the next state in which the coder will find itself after this operation also depends upon these same quantities. Table 1 illustrates the relationship between present state, data in, code sent and the next state for the coder of FIG. 1.

TABLE 1

| Present state | data in | code sent | next state |
|---|---|---|---|
| 00 | 0 | 00 | 00 |
| 00 | 1 | 11 | 01 |
| 01 | 0 | 10 | 10 |
| 01 | 1 | 01 | 11 |
| 10 | 0 | 11 | 00 |
| 10 | 1 | 00 | 01 |
| 11 | 0 | 01 | 10 |
| 11 | 1 | 10 | 11 |

In fact as should be clear, the state of the coder is just the last K data bits that have been entered into to the coder. Suppose that the coder starts in state 00 and that the data sequence 1011010 is presented to it. The chain of events is illustrated in table 2.

TABLE 2

| state | data | code sent |
|---|---|---|
| 00 | 1 | 11 |

TABLE 2-continued

| state | data | code sent |
|-------|------|-----------|
| 01    | 0    | 10        |
| 10    | 1    | 00        |
| 01    | 1    | 10        |
| 11    | 0    | 01        |
| 10    | 1    | 00        |
| 01    | 0    | 10        |
| 10    |      |           |

Thus the code sequence transmitted is 11-10-00-10-01-00-10 . . . which has twice as many symbols as the corresponding data 1011010 . . . and this code is called accordingly a RATE ½ code.

The received sequence is likely to contain errors, for example it might consist of the sequence 11-10-00-11-01-00-10 . . . which:

(1) differs in the 8th symbol from the code sequence actually sent and (2) is illegal.

The decoder has the task of finding the data sequence corresponding to the code sequence which was most probably sent.

A well known technique for decoding is called the VITERBI algorithm (VA). A decoder using the VA operates as follows.

For each possible state S in the code (of which there are four in the example given so far) the decoder stores:

(1) The "best" data sequence so far found which terminates in each state S (known as the BEST PATH to state S) and (2) a number, M(S), known as the METRIC for state S, which consists of the number of received symbols which are correct symbols for the legal codeword corresponding to the best path terminating in state S.

Possible data sequences and/or the corresponding code are commonly called PATHS or PATH HISTORIES. Each data symbol and/or its associated code symbols is called a BRANCH.

It is normal terminology to speak of a branch on a path leading to a state S, meaning either:

(1) a symbol or data digit in a data sequence at the end of which the coder is left in the state S, or (2) the code symbols in a code sequence associated with the data sequence on the end of which the coder is left in the state S.

The best path leading to any particular state is in fact just that data sequence whose corresponding codeword has the highest metric since this path has the most correct branches, in other words the least number of errors.

Each state in the code has two possible PREDECESSOR states called its 0-predecessor and its 1-predecessor. For example state 01 has 00 and 10 as its 0-predecessor and 1-predecessor states respectively, since either of these stats could give rise to state 01 if a data bit of 1 is entered. We shall use the expression P0(S) to denote the 0-predecessor to state S and P1(S) to denote the 1-predecessor. So for example P0(01)=00 and P1(01)=10. Another example for K=4 is that P0(1101)=0110 and P1(1101)=1110.

We will define a terminology to describe time. Whenever a new set of symbols is received by the decoder we shall say that time has advanced by one TIMESLOT. We shall say that the current time at which a symbol pair is being received is timeslot T and will use timeslot T−1 to denote the moment when the previous symbol pair was received and so on. Thus timeslot T+1 will denote the moment when the next pair of symbols is to be received.

The key fact that the VA exploits to decode the received sequence is that the best path terminating in state S must be either:

(1) an extension by the data branch 0 of the best path terminating in state P0(S) at time T−1, or (2) an extension by the data branch 1 of the best path terminating in state P1(S) at time T−1.

At each new timeslot the decoder updates this stored information as follows.

For each of the $2^K$ states S from 000 . . . 000 to 111 . . . 111 the decoder calculates $$M0 = M(P0(S)) + E(P0,S)$$

and $$M1 = M(P1(S)) + E(P1,S)$$

where E(P0,S) is the number of received symbols which correspond with those which would have been sent if the present state of the decoder were S and its predecessor had been P0, while E(P1,S) is the number of received symbols which correspnond with those which would have been sent if the present state of the decoder were S and its predecessor had been P1.

If M0 is greater than M1 the decoder will choose M0 for the new metric for state S and will choose for the new, best path terminating in state S the previously best path terminating in P0, plus the extra branch 0. Conversely, if M1 is greater than M0 the decoder will choose M1 for the new metric for state S and will choose for the new, best path terminating in state S the previously best path terminating in P1, plus the extra branch 1.

When the decoder has chosen the new best path terminating in state S it updates the stored metric for state S and also updates the stored best path for state S. For reasons to be explained shortly, it turns out not to be necessary for the decoder to store the whole of the best path terminating in each state but only a SEGMENT of length L, where L is between about 3×K and 25×K. For K=6 this amounts to between 18 and 150 bits. The longer the stored path history segments the better is the performance of the decoder, although massive increases in the value of L are offset by a law of diminishing returns.

By proceeding in this manner the decoder can update its stored information each timeslot. In other words the decoder at all times knows the best path which terminates in each state. Now it turns out that if the best paths for each of the states are compared, they usually differ from each other in only the last few symbols. Symbols in the best paths associated with times greater than L branches earlier, where L is about 10×K are usually the same for all states. The decoder thus can choose any state S and "look back" along the best path terminating in state S and send out as a decoded digit, any branch (i.e. data bit) a given fixed number L of branches earlier, i.e. a data bit entered at time T−L. The value of L is the history segment length of between 3×K and 25×K mentioned above. Naturally the decoder does not store path history segments longer than L bits since once it has decoded a bit (i.e. retrieved it from the path history segment L branches earlier) this information is no longer needed by the decoder. The larger the value of L the more likely are the best paths for all states to be identical at timeslot T−L. Thus the longer are the stored path history segments the better is the performance of the decoder, although as L is increased the performance asymptotically levels out.

This invention is an improvement to decoders which greatly simplifies the problem of management of the stored paths. As has been described above, every time a new set of received signal symbols is acquired by the decoder it must, for every state make a copy of the best path terminating in either its 0-predecessor or its 1-predecessor and append either a 0 or a 1 to this path. For example in a rate ½ decoder for which K=6, there are 64 states and every time a pair of branch symbols is received the decoder must copy 64 path history segments each of length perhaps L=64 or 128 bits, (as has been mentioned, the longer stored the path history segments the better is the performance of the decoder). The amount of information which must be moved around in the decoder presents a design problem. There is thus a conflict between the desire to make the value of L large to improve the performance of the decoder, and the difficulty which this produces of moving around very large amounts of information in a small time. This difficulty will here be called the PATH-HISTORY MANAGEMENT PROBLEM. The purpose of the present invention is to reduce this difficulty.

According to this invention, instead of storing, for each state S, the best path terminating at S, the decoder stores instead, the decisions which it has made for that state, represented by 0s and 1s. These decisions are never copied from one state to another as is done in conventional decoders described above. Instead only a 0 or a 1 is appended to the list of decisions for each state in each timeslot. The need to move large amounts of digits does not arise.

The essential difference between this approach and the conventional is that according to the present invention, decisions are now stored in association with states rather than in association with paths. All decisions made regarding the best predecessor to state S are stored in association with S. The conventional way would be to associate decisions with paths, which in successive timeslots are passed from state to state.

There have been other attempts to solve this problem, for example by associating with each path a token and passing this token from state to state. Problems with this include the fact that access to the path requires complex indirect addressing.

According to a preferred embodiment of this invention, the best path terminating in state S is determined from a stored set of decisions for the states. This we will do in two parts. Firstly we show that the best path can be recovered by a search, and secondly we show that this search can be carried out very economically.

To examine the best path terminating in state S the decoder examines the last decision (i.e. the decision made at time T) stored for state S. If this is a 0 then the decoder continues the search by examining the decisions for timeslot T-1 of the 0-predecessor P0(S). Otherwise it continues the search by examining the decisions for timeslot T-1 for the 1-predecessor P1(S). Suppose for example, that the decision was a 0, then the decoder examines the decision stored for state P0(S) at time T-1. If this decision is a 0 the decoder continues the search with P0(P0(SS)) at time T-2, otherwise it continues the search with state P1(P0(S)) at time T-2. The decoder continues in this way examining earlier and earlier timeslots.

Thus the decoder can recover the best path terminating in state S by such a continued search, and by searching to whatever depth it requires the decoder can recover as many branches in the best path as it requires.

We shall use the expression "SEARCH THROUGH DECISION SPACE" for the process of systematically examining decisions of the various states in this way to recover data from the best path terminating in state S. The actual mechanism of the search through decision space can be easily and quickly carried out by means of a shift register and the decision history.

This search can be performed very economically by the following observation. The decoder does not need to search through decision space each and every time it needs a branch symbol to send out as decoded data. Instead it is more efficient to carry out such a search only every M timeslots, where M is an integer greater than one, and then it searches back L branches to recover not just one, but M bits from this best path at one search. These M bits can then be saved temporarily and output from the decoder one per timeslot when required. In this way, since searches do not now need to be undertaken very often, the decoder can, with little effort, afford to carry out very long searches with corresponding improvement in performance of the decoder.

EXAMPLE 1

A more detailed description of the decoding process will now be given with reference to a decoder operations with parameters:

K=2

M=5

L=16

It is, of course, essential that a decoder conforms to the codes used by the transmitter and a transistor using the codes specified in Table 1 is assumed. K=2 is lower than used in commercial practice but it involves only four legitimate states which is convenient for description. It is emphasised that, although there are many paths, every legitimate path ends in one or other of the four legitimate states.

Although the system is digitised the signals themselves are in an analogue form and, for a better understanding of the invention, it is better to take cognisance of this circumstance. For a transmission system using frequency shift keying each bit is represented by a signal taking one of two frequencies (i.e. 2−FSK) which signal demodulates to a voltage taking one of two values; it is convenient to choose the scale and origin so that these two values are +1 and −1. Under perfect conditions and with no interference the demodulator would only ever give values of +1 or −1, i.e. the "correct" value to conform with the transmitter. However, the Viterbi method is designed for operation when conditions are not perfect when, e.g. because of interference, values between +1 and −1 occur. Under adverse condition values close to, and even on the wrong side of, zero may occur. It is the purpose of the decoding to avoid confusion except under extreme adversity.

As indicated in Table 1, two bits of code are sent for each bit of data (because the system is ½ rate.) Thus the receiver measures two parameters each corresponding to one of the bits. It is convenient to define a column matrix T to contain the two measurements as its two elements.

Table 1 specifies the four (legal) signals which exist in the system and it is convenient to associate a (row) matrix with each legal signal as follows:

$A = [+1, +1]$ associated with code 1,1

$B = [+1, -1]$ associated with code 1,0

$C = [-1, +1]$ associated with code 0,1

$D = [-1, -1]$ associated with code 0,0

(Note $C = -B$ and $D = -A$)

The receiver uses the matrix T to calculate a metric for each legal signal. The four metrics which it calculates are:
AT
BT
CT, and
DT.

Under perfect, interference free, conditions one of these metrics, i.e. the "correct" one, will have the value +2. Two will have the value zero and the remaining metric will take the value −2. In the presence of interference the "correct" metric may be more difficult to discover especially when, with substantial interference, the "correct" value is not the highest value. In this case the "correct" signal may still be recovered (if the substantial interference is not of too long a duration) by the path tracing feature which will now be described.

As has been explained above, although there are many paths, there are only four legal end states and every path ends on one or other of the four end states. The receiver includes metric storage means which stores four metrics, i.e. one for each of these end states, and these metrics are updated in each time slot.

Designating the stored metrics as M(00), M(01), M(10) and M(11) these are updated to obtain new values designated as F(00), F(01), F(10) and F(11). Each F-value can be obtained from either of two M-values, namely:

|  | 0-PREDECESSOR |  | 1-PREDECESSOR |
|---|---|---|---|
| F(00) = | M(00) + DT | or | M(10) + AT |
| F(01) = | M(00) + AT | or | M(10) + DT |
| F(10) = | M(01) + BT | or | M(11) + CT |
| F(11) = | M(01) + CT | or | M(11) + BT |

The receiver computes all the expressions on the right hand sides and selects the higher alternative in each case. This selection determines both an updated metric and a path fit for each state. The selected value is the updated metric and, when the full set of values has been determined, the selected values are transferred each to its appropriate location in the metric storage means.

The selection decides the path followed for each legitimate end state, i.e. it assigns a predecessor to each state. In the case of a ½-rate system there is always a choice of two predecessors and, therefore a single bit is sufficient to define the decision. If the selection is taken from the column headed "0-predecessor" the decision bit is "0". In the alternate case the decision bit is "1".

The metrics are retained only into the next time slot where they are updated (and used to generate a new set of four decision bits). The decision bits are retained for 16 time slots so that by using these decision bits a path can be traced for 16 steps. This keeps storage demand low, i.e. 4 locations for metrics, 64 locations for decision bits (i.e. 16 sets each of 4 bits) plus working storage for updating.

The bits are retained in a decision store and this decision store is accessed using as addresses
(1) The identity of the time slot, and
(2) The state,
to retrieve the decision bit. The conjunction of decision bit and state defines the predecessor state providing the two addresses needed to initiate the next retrograde step.

This retrograde step generates from the decision storage using a single bit of the path. Successively retrograde stages generate successively earlier bits of the path.

The oldest sections of the path constitutes the output from the receiver.

The tracing of a path using the decision storage means will be further described using arbitrarily assigned numerical values.

Table X below shows an arbitrary state for the decision-store (but only 6 time slots, designated A–F, are provided to save space). Time slot A is the most recent with slots B–F running in retrograde time sequence.

TABLE X

|  | A | B | C | D | E | F |
|---|---|---|---|---|---|---|
| 00 | 1 | 0 | 1 | 0 | 1 | 0 |
| 01 | 1 | 0 | 1 | 0 | 1 | 0 |
| 10 | 0 | 1 | 1 | 0 | 0 | 1 |
| 11 | 0 | 1 | 1 | 0 | 0 | 1 |

Table X can be used for a retrograde trace initiated at any of the four possible end states. Table Y(00) shows a trace initiated from state (00).

TABLE Y(00)

| TIME SLOT | STATE | PATH BIT |
|---|---|---|
| A | 00 | 1 |
| B | 10 | 1 |
| C | 11 | 1 |
| D | 11 | 0 |
| E | 01 | 1 |
| F | 10 | 1 |
|  | 11 |  |

Table Y(00) was constructed as follows. State 00 was selected for initiation in time slot A. Using "00" and "A" as addresses and accessing Table X retrives path bit "1" and "1" is entered in Table Y(00). The 1-predecessor of state 00 is state 10 which, as is shown in line B of Table Y(00), is used to initiate the second step. Table Y(00) is built up line by line as indicated. The column headed "Path Bit" constitutes the output of the receiver. Since the output is required in chronological sequence and Table Y(00) is retrograde, the output is obtained by reading up the column. (It should be noted that the next "state" is obtained from the current state by concatenating the decision bit at the left and excising the right bit. A shift register can be used for this purpose.)

Table Y(10) is similar to Table Y(00) but initiated from state (10).

TABLE Y(10)

| TIME SLOT | STATE | PATH BIT |
|---|---|---|
| A | 10 | 0 |

TABLE Y(10)-continued

| TIME SLOT | STATE | PATH BIT |
|---|---|---|
| B | 01 | 0 |
| C | 00 | 1 |
| D | 10 | 0 |
| E | 01 | 1 |
| F | 10 | 1 |
|  | 11 |  |

On comparison, it will be noticed that lines A-D of Tables Y(00) and Y(10) differ but lines E and below are the same. In other words the two paths converge at line E. (If State (01) is chosen to initiate it can be seen that convergence occurs at lines B of Table Y(00) and for state (11) as initiator the convergence occurs at line B of Table Y(10).) This illustrates that there is an indeterminate region where a plurality of paths is possible. At some stage (depending on the amount of interference) all the alternative paths tend to converge and there is only one legitimate path.

In a real system there is no guarantee that convergence will occur but with a long path it is almost certain (i.e. the pobability is very close to unity). It is an advantage of this method that stored decision is never moved within the decision storage means so that long paths are practical. It is desirable to output several bits for each trace; since the output runs at one bit per time slot, the number of time slots available for a trace equal the number of bits produced in each trace. Thus, in Example 1, making a trace for 16 times slots and recovering 4 bits for each trace allows 4 time slots for each trace.

Table X indicates the organisation suitable for the decision-bit storage means. That is it requires an area for each time slot and each area must provide one-bit capacity for each state. The time slot areas are operated in a cyclic time sequence with a pointer to define the starting and end points of the cycle. Each new set of four path-bits overwrites the oldest area.

The pointer is set to define the oldest area and the overwriting always occurs in the area defined by the pointer. Immediately after overwriting the pointer defines the newest area (and therefore the starting point for a trace). Adding one to the pointer (and resetting to zero if needed) resets it to the oldest area. It is emphasised that the stored decision-bits are never moved.

This concludes the description of the method but it is desired to add a comment on the end metrics, i.e. the values M(00), M(01), M(10) and M(11) defined above. It will be appreciated that only the differences between the values matter. Referring back to the defining equations it will be seen that each value is taken as the higher of a choice of two values whereby states with a low metric do not contribute. This has the effect that the range of values is limited to 8 and satisfactory results can be obtained even if the storage locations have a limited numerical capacity. Provided the capacity of the stores is sufficient, overflow can be allowed without causing errors.

EXAMPLE 2

This example uses the same method as Example 1 but the size is typical of a commercial system ($K=6$, $M=16$ and $L=128$). The system is still ½-rate so that there are still 4 legitimate signals in each time slot. This feature is related to the ½-rate; the path length is not relevant to this feature.

The constraint length is 6 (i.e. $K=6$) which means that there are 64 end-states and the receiver requires 64 storage locations for metrics. In addition, the receiver requires 64-bits (i.e. 8 bytes) capacity for decision-bits in each time slot. It stores decision information for 128 ($L=128$) time slots so that 1024 bytes are needed for the decision store. Thus, even with an allowance for working storage, two kilobytes is sufficient.

The decoder in this example will store decisions in a Random Access Memory (RAM) containing 2048 eight-bit bytes. Such a RAM has 11 address bits and 8 data bits.

Since there are 64 states, decisions (stored 8 to byte) will occupy 8 bytes and each byte will require 3 address bits. The remaining 8 address bits will be used to address timeslots.

Circular addressing will be used for timeslots. In other words a counter capable of counting from 0 to 255 will be used to address the current timeslot T. When this count has value T, a timeslot t timelots earlier is associated with count T-t modulo 256. Timeslots older than T-255 will never be needed and will have their data overwritten.

Thus it is easy to organise the addressing for the RAM such that it is simple to determine the location of the decision associated with a given state in a given timeslot.

A convenient way to store the decisions is to wait until (for example) 8 decisions are available, saving them temporarily in a serial-to-parallel shift register, and then to write the set of 8 decisions simultaneously into a single RAM address. Thus during one timeslot there will be 8 occasions when the need arises to write decisions to RAM. These occasions will be called BREAKS. This terminology neither implies nor excludes any temporal pause.

A simple method of searching through decision space is illustrated in FIG. 2. In this figure six parallel outputs 11 from a six-bit shift register 10 connect to six of the fourteen address terminals of a memory system 12. The remaining eight address terminals 13 for the memory system are connected to a backward timeslot counter 15. The input terminal 14 to the shift register 10 is taken from the single output terminal of the memory system.

The decoder shown in FIG. 2 includes the usual decision code generator 101 (e.g. typically fed by a radio signal receiver 100) for generating a decision code for each end state in each time slot and supplying the result over line 104 to be stored in decision storage means 12 which is addressable by identity of time slot and end state, for path decision codes. Each code output from the generator 101 over line 104 is stored in a memory location addressed by the code's end state and the current time slot.

As also shown in FIG. 2, there is a first address register means 12 and adapted to retain a time slot identity as an address. A second address register 10 is also operatively connected to the decision storage means 12 and is adapted to retain a state as an address—and includes suitable means for updating its content to represent the identity of the preceding time slot. The second address register 10 is a shift register which also includes an input line 14 to receive as input the state defined by (i.e. addressed by) the retrieved decision code and the content of the second register.

Conventionally, the decision code generator 101 of FIG. 2 includes storage means 103 including a storage location for a metric for each end state. The generator 101 typically includes correlating means adapted to produce a signal metrics measuring the correlation between a received signal and a legitimate signal as well as updating means operatively connected to the correlating means and to the metric storage means 102 to update the stored metrics in accordance with the signal metrics. The updating means in generator 101 may comprise (a) means for accessing the metric storage means 102 with addresses constituting the identities of all legitimate predecessor states of each end state to retrieve predecessor metrics; (b) an adder for adding to each retrieved metric the signal metric corresponding to the transition from the predecessor state to the end state; (c) a selection means for selecting the highest sum and its predecessor state corresponding to each end state; and (d) means for transferring the highest sum into metric storage means 103 at a location which is addressed by the end state. The generator 101 then includes means for deriving the path decision code from the selected predecessor.

A simple method of implementing the memory system using a memory device with 8 data bits is illustrated in FIG. 3. In this figure three parallel outputs 24 from a six-bit shift register 20 are connected to the output from an eight-to-one multiplexer 21 which recovers a particular bit 25, associated with a decision regarding a particular state, from an block of eight decisions 26 stored in an eight-bit byte. This multiplexer is in turn connected to the data output from the RAM 22. The RAM is addressed by eight outputs 27 from a backward timeslot counter 23, and from three outputs 28 from the shift register 20.

Suppose the shift register contains the number S and that the backward timeslot counter contains the number T. With this addressing, the input 24 to the shift register from the RAM is precisely the decision which was made regarding the predecessor to state S at timeslot T. To search back one timeslot, i.e. to recover the next bit in the best path, the shift register is clocked and the backward timeslot counter is decremented.

This simple circuit works since it reflects the essentially simple relationship between states and their predecessors. By successively shifting the shift register and by decrementing the counter the search is efficiently carried out.

A convenient moment to carry out a search is during a break as defined above. Suppose that during a break a backward search of one timeslot (i.e. one decision bit on the best path) is made, then it follows that in each timeslot a lookback of 8 decisions will be achieved. In the course of 16 timeslots a lookback of 128 timeslots can be achieved. The last 16 decisions found by this search are then saved, for example in a 16 bit shift register. These are output, one per timeslot during the next 16 timeslots, as outputs from the decoder.

Thus the search can be instrumented very economically.

What is claimed is:

1. A method of recovering data from convolutionally encoded signals received as a sequence of coded symbols within successive time slots, which method comprises the steps of:
   (I) generating a decision code for each end state of the coded symbols in each time slot, wherein each of said decision codes identifies one step of a retrograde path, said step defining an end state in the previous time slot;
   (II) storing all of said decision codes in decision storage means, each of said codes being stored in a storage location addressable by the end state and time slot of a given code;
   (III) retrieving a path from said decision storage means wherein the path is generated by stepwise retrograde search through the stored decision codes, wherein each step comprises accessing the decision storage means using as addresses the identity of a time slot and an end state in the time slot to retrieve a decision code;
   (IV) generating the identity of the predecessor end state from the retrieved code and the address used to retrieve it and also generating the identity of the previous time slot, whereby repetition of said step from each time slot to its preceding time slot generates the path; and
   (V) outputting the end of said path as the recovered data.

2. A method according to claim 1 wherein said steps (I) through (V) comprise:
   (a) storing a metric for each end state, and
   (b) updating each metric for each time slot in accordance with signals received in said time slot, wherein said updating comprises
   (b) (i) accessing metric storage means providing a storage location for each end state metric with a plurality of addresses for each end state, said addresses constituting the identities of all the legitimate predecessor states of each state whereby a plurality of predecessor metrics are retrieved;
   (b)(ii) adding to each retrieved metric a signal metric measuring the correlation between the received signal and the legitimate signal corresponding to the transition from the predecessor state to the state whereby a plurality of potential metrics is generated for each state; and
   (b)(iii) selecting the highest of said potential metrics as the updated metric for the end state and the state from which it was derived as the assigned predecessor state;
whereby performing steps (b)(i), (b)(ii) and (b)(iii) for each end state generates an updated end metric for each state and the decision code is derived from the assigned predecessor state.

3. A method according to claim 2 wherein said updating step generates each decision code as a single bit which takes the value "0" when the assigned predecessor is the 0-predecessor and the value "1" when the assigned predecessor is the 1-predecessor.

4. A method according to claim 1, 2 or 3 wherein the storing step comprises storing said decision codes in a cyclic store where current codes overwrite the oldest codes and a pointer is maintained to define the beginning and end of the sequence.

5. A method according to claim 1 where the constraint length is 6 with 64 end states and wherein the retrograde search comprises 32 to 2048 steps.

6. A method according to claim 1 wherein step (V) includes outputting more than one bit as the recovered data.

7. A method of recovering data from convolutionally encoded signals which method comprises the steps of:
   (I) generating a decision code for each end state in each time slot;
   (II) storing all of said decision codes in decision storage means each of said codes being stored in a location addressable by the code's end state and time slot;

(III) retrieving a path from said decision storage means wherein the path is generated by stepwise retrograde search through the stored decision codes wherein each step comprises accessing the decision storage means using as addresses the identity of a time slot and a state in the time slot to retrieve a decision code defining a state in the preceding time slot whereby repetition of said step from each time slot to its preceding time slot generates the path;

(IV) outputting M bits, being the end of said path, as the recovered data, and initiating a retrograde search as specified in step (III) every M time slots wherein M is an integer greater than 1.

8. A signal decoder for recovering output from convolutionally encoded signals having a decision code associated with each end state in each of successive time slots, which decoder comprises:

(A) a decision storage means (12) providing storage locations, addressable by identity of time slot and end state, for path decision codes said code storage means being operatively connected to store each code in the location addressed by the code's end state and the current time slot;

(B) first address register (15) operatively connected to the decision storage means, said first register being adapted to retain the identity of the just preceding time slot as address;

(C) a second address register (10) operatively connected to the decision storage means, said second register being adapted to retain a state as address; and (D) means (14) for updating the second address register to the state defined by the retrieved decision code and the content of the second register.

9. A decoder according to claim 8, wherein the second address register is a shift register connected to receive as input the code retrieved from the decision storage means.

10. A decoder as in claim 8 or 9 further comprising:

(E) metric storage means including a storage location for a metric for each end state;

(F) correlating means adapted to produce signal metric measuring the correlation between a received signal and a legitimate signal;

(G) updating means operatively connected to the correlating means and the metric storage means, said updating means being adapted to update the stored metrics in accordance with the signal metrics, said updating means comprising:

(H) (I) means for accessing the metric storage means with addresses constituting the identities of all the legitimate predecessor states of each end state to retrieve predecessor metrics;

(H) (II) an adder for adding to each retrieved metric the signal metric corresponding to the transition from the predecessor state to the end state;

(H) (III) selection means for selecting the highest sum and its predecessor state corresponding to each end state;

(H) (IV) means for transferring said highest sum into the storage location of the metric storage means which location is addressed by the end state; and (I) means for deriving the path decision code from the predecessor selected in step (H) (III).

11. A method according to claim 6 wherein M is an integer in the range of 4 to 16.

12. A method according to claim 7 wherein M equals 16.

* * * * *